June 25, 1957  E. T. DAVIS  2,797,291
CONTROL SYSTEMS OF THE DURATION-ADJUSTING TYPE
Filed Aug. 5, 1952  6 Sheets-Sheet 1

INVENTOR.
ELWOOD T. DAVIS
BY
*Woodcock and Phelan*
ATTORNEYS

INVENTOR.
ELWOOD T. DAVIS

United States Patent Office 2,797,291
Patented June 25, 1957

2,797,291

CONTROL SYSTEMS OF THE DURATION-ADJUSTING TYPE

Elwood T. Davis, Havertown, Pa., assignor to Leeds and Northrup Company, Philadelphia, Pa., a corporation of Pennsylvania Application August 5, 1952, Serial No. 302,794

10 Claims. (Cl. 219—20)

This invention relates to control systems of the duration-adjusting type where the magnitude of the controlled variable is changed by variation of the average time a final control element is in one or other of two control positions.

In my Patent No. 2,325,232 systems of the duration-adjusting type have been disclosed and have been quite successful in regulating the magnitude of a controlled variable by change in the average time a final control element occupies one or the other of its control positions. The change in such average time is accomplished in my patent by the provision of one or more thermal assemblies in a control network each including a resistor with means for varying its temperature and, hence, for varying its resistance in the control network. While such systems have been quite satisfactory, they do not readily provide the flexibility sometimes needed where the magnitude of rate action is to be independently varied over a relatively wide range and in applications where it is desired to provide a slow reset action.

In carrying out the present invention, a high degree of flexibility is achieved with adjustable rate action and with reset action of any desired speed over relatively wide limits. In one form of the invention, the variation in the average time a control element remains in one or the other of its control positions is varied by means of an energy-storing means such as a capacitor and an energy-flow controller such as a non-capacitive impedance arranged in association with a control network to provide the needed control actions. By providing an energy-storing device and a flow-resistance network in association therewith, other advantages arise and make possible the provision of immediate change from manual to automatic control without affecting the magnitude of the controlled variable during and after the change from one to the other. Additionally, there may be provided either one or more of the following control actions; proportional, reset, rate, second and higher derivatives, and a second or higher integral response. Even with a number of control actions included, the system as a whole is relatively simple.

For further objects and advantages of the invention, reference is to be had to the following detailed description taken in conjunction with the accompanying drawings in which.

Figure 1:
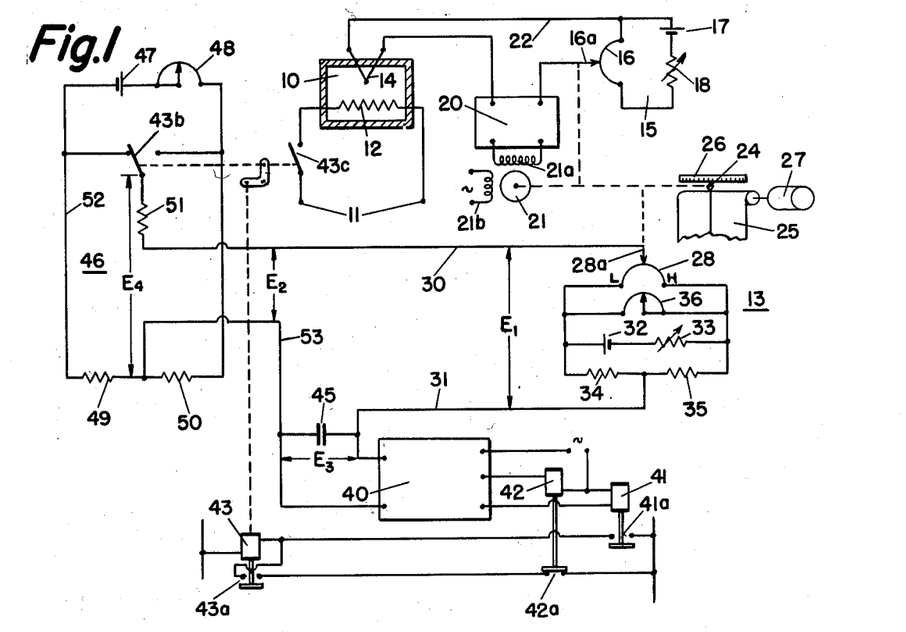
Fig. 1 diagrammatically illustrates the invention as applied to a control system with average-position action.

Referring to Fig. 1, the invention has been shown as applied to the control of temperature though it is to be understood it is equally applicable to the control of the magnitude of any condition, hereinafter referred to as the "controlled variable." Where as in Fig. 1 the temperature of an enclosure, such as a furnace 10, is to be maintained at a predetermined value which may be referred to as the "set point," the controlled medium is the current flowing from supply lines 11 through a heating resistor 12 during the time a circuit making and breaking device 43c is in closed position. Variation in the magnitude of the controlled variable, temperature, is detected by the measuring junction of a thermocouple 14 located within the enclosure 10, the output of which is opposed by a voltage derived from a potentiometer 15 including a slidewire 16, a battery 17, and a rheostat 18. By means of any suitable detecting and amplifying device 20, such as shown in Williams Patent No. 2,113,-164, a motor 21, having a control winding 21a energized by the detecting and amplifying device 20 and a power winding 21b, adjusts slidewire contact 16a in a direction to reduce the difference between the potential developed by thermocouple 14 and the potential difference between conductor 22 and slidewire contact 16a.

With the adjustment of slidewire contact 16a there are simultaneously driven a pen and index 24 relative to a chart 25, the associated scale 26, and a movable contact 28a relative to a control slidewire 28. The chart 25 is driven at constant speed by any suitable means such as a motor 27. The control slidewire 28 forms a part of the control circuit including conductors 30 and 31. Current flows from a battery 32 through slidewire 28 and a rheostat 33 in network 13. With conductor 31 connected intermediate resistors 34 and 35 of equal resistance values, it will be seen that zero potential difference will be developed between conductors 30 and 31 with contacts 28a in its mid-position. A proportional-band adjusting resistor 36 is connected in parallel with slidewire 28.

From the foregoing it will be seen that as the motor 21 in response to change in temperature of thermocouple 14 moves slidewire contact 28a from its mid-position there will be developed a potential difference or voltage $E_1$ of one polarity or the other depending on the direction of temperature change and of magnitude depending upon the extent of that change.

An amplifier 40 controls the energization of relays 41 and 42 in response to the difference between the voltage $E_1$ and a second potential difference or voltage $E_2$. The relay 41 controls the energization of a circuit maker and breaker 43 which may be a contactor of any suitable type having normally open holding contacts 43a, the contact element 43b movable between two circuit-controlling positions and the movable contact element 43c for controlling the power circuit of heating resistor 12. When relay 41 is energized by amplifier 40, it closes its contacts 41a to energize the operating coil of contactor 43 which thereupon by contact 43c closes the heating circuit, moves contact 43b to its second circuit-closing position, and closes the circuit through contacts 43a to maintain the contactor 43 in its energized position. When relay 42 is energized, it opens its contacts 42a, thus interrupting the circuit through the operating coil of contactor 43 which thereupon is deenergized to return its contacts to their illustrated positions.

The potential difference or voltage $E_2$ is developed from a control network 46 which includes a battery 47, an adjustable rheostat 48, and resistors 49 and 50, preferably of equal resistance. As shown, the voltage $E_2$ is derived from conductor 30 by way of resistor 51 and by way of contact 43b to conductor 52 leading to the negative pole of battery 47; and by way of conductor 53 connected to the junction between resistors 49 and 50.

In systems of the type in which there is a predetermined relation between the value of the controlled variable (the temperature of enclosure 10) and the time-average position of the final control element 43c which is moved periodically between its fixed positions, the percentage of "on-time" of the final control element is made dependent upon the value of the controlled variable.

The network 46 in conjunction with the contact element 43b provides for the cyclic operation of the final control element 43c between its illustrated "off" position and the "on" position in which heating current flows through resistor 12. With slidewire contact 23a of network 13 at its illustrated mid-position the potential difference $E_1$ between conductors 30 and 31 will be zero. There will then be a charging current for capacitor 45 due solely to the potential difference $E_4$ derived from network 46, the polarity of that potential difference reversing with each operation of element 43b operated with element 43c. Thus, the capacitor 45 will be charged through a circuit including resistor 51 first in one direction and then in the opposite direction.

Figure 2:
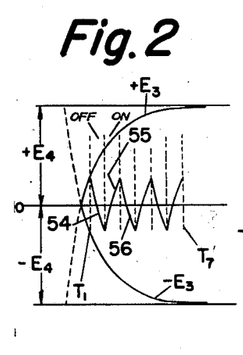
Figs. 2–4 are graphs explanatory of the operation of the invention.

The operation can be readily visualized by referring to Fig. 2 where values of the voltage $E_4$ are shown by horizontal lines, one being the value in a positive direction and the other being the value in the negative direction, the average value between the two limits being shown by the horizontal "zero" line. With the parts in the position shown in Fig. 1 and with no charge on capacitor 45, upon application of the voltage $+E_4$, the potential difference or voltage $E_2$ (equal to $E_3$) rises in the manner illustrated by the graph $+E_3$. If the voltage $-E_4$ is applied, voltage $E_3$ rises or increases in the negative direction as illustrated by the graph $-E_3$. The graphs $+E_3$ and $-E_3$ are exponential curves and illustrate the rise in voltage in the positive and negative directions in the absence of the occurrence of the control now to be described. It is to be understood that the graphs $+E_3$ and $-E_3$ may begin at any voltage value, depending upon the charge on capacitor 45, and follow an exponential charging curve toward the voltage $E_4$. For example, if the charge on capacitor 45 were a maximum in the negative direction, and a positive $E_4$ were applied, the change of $E_3$ would follow the broken-line extension of $+E_3$.

It will now be assumed that the element 43b has just arrived at its left-hand position, this occurring at the time $T_1$. At time $T_1$ the voltage $E_4$ of negative polarity is applied to the charging circuit including resistor 51, conductors 30, 31 and capacitor 45. The voltage $E_2$ discharges the capacitor with respect to time as illustrated by the graph 54 which, of course, follows the appropriate portion of the $-E_3$ graph. When the negative voltage across the input terminals of amplifier 40 exceeds the sensitivity range of amplifier 40, the relay 41 is energized and through closure of its contacts 41a energizes contactor 43 to close the heater circuit and to move contact element 43b to its right-hand position. The polarity of $E_4$ is immediately reversed and the potential difference $E_3$ immediately rises as indicated by the graph 55 having the shape of the appropriate portion of graph $+E_3$. When $E_3$ attains the maximum value shown in Fig. 2 by graph 55, relay 42 is energized to open contact 42a and to deenergize contactor 43 for the return of the contacts to their illustrated positions. The potential difference $E_3$ then decreases as indicated by the graph 56, of the same shape as the corresponding part of graph 54, and, as indicated by the dotted lines and labels, the "off" time is equal to the "on" time; that is to say, current flows through the heating resistor 12 during a series of predetermined time intervals, each heating interval being spaced by a non-heating interval of equal length or duration.

The manner in which the ratio of "time-on" to "time-off" may be varied in order to vary the average magnitude of the controlled variable and the heat input to the enclosure 10 will now be described.

Figure 3:
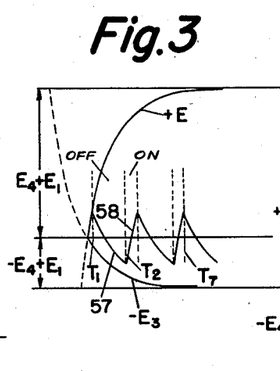

If there is variation in the temperature of the furnace or enclosure 10, the changed output of thermocouple 14 will through the operation of motor 21 be indicated on scale 26 and, if desired, recorded on the chart 25. The motor will also move contact 28a from its mid-position in a direction depending upon the direction of change of the temperature. If the temperature is too high, it will be assumed that the contact 28a will be moved to the right of its mid-position. The effect of the movement is to develop a voltage or potential difference $E_1$ of magnitude related to the departure of the temperature from its predetermined value, generally referred to as the set point. With movement of contact 28a to the right, the polarity of voltage $E_1$ will be such that conductor 30 will be made negative and conductor 31 positive. Thus, potential difference $E_1$ will be in opposition to or of opposite polarity with respect to potential difference $-E_4$ and additive with respect to $+E_4$. As shown in Fig. 3, the capacitor charging voltage $(-E_4+E_1)$ with $E_4$ negative, corresponding with the illustrated position of the parts, will be reduced in magnitude by right-hand movement of contact 28a. However, when switch element 43b is moved to its right-hand position the capacitor charging voltage $(+E_4+E_1)$ is increased. The net result is that at the time $T_1$ the instant the parts are moved to their illustrated positions, the decreased charging voltage $(-E_4+E_1)$ will be applied to the capacitor charging circuit and it will discharge along the appropriate portion of exponential graph $-E_3$. The applicable portion of graph $-E_3$ is of considerably different shape than the applicable portion of the $-E_3$ graph of Fig. 2. Because of the slower discharge of the capacitor and the slower rise of its charge to the illustrated negative potential, a considerably longer time is required for $-E_3$ to reach maximum negative values corresponding with those illustrated in Fig. 2. Thus, the "off-time," as shown, is greatly increased. On the other hand, at the instant of attainment of that value of negative voltage needed to energize the coil of relay 41 there is applied by operation of element 43b a capacitor charging voltage of greater value (greater by $E_1$), than shown in Fig. 2. The time required as indicated by the graph 58 for $E_3$ to rise to the same positive values as shown in Fig. 2 is decreased and hence, the "time-on" or the time during which heating current flows through resistor 12 is made materially less than shown in Fig. 2.

By comparison of Figs. 2 and 3 it will be seen that two things have occurred. First, as already explained, there has occurred the increase in the "off-time" as compared with the "on-time." Secondly, the frequency of application of the controlled medium, the heating current, has been decreased. From time $T_1$ to time $T_7$ it will be seen that in Fig. 2 the control element 43c was operated and maintained in its closed position during three heating periods. On the other hand, in Fig. 3 there were only two heating periods, each being shorter than each corresponding period of Fig. 2. By reason of this dual change in operation, the temperature of the furnace or enclosure 10 will immediately decrease. As the temperature changes, the contact 28a of control slidewire 28 will be correspondingly adjusted and there will be a gradual change in the relative on and off times until the average "time-on" is of a length and frequency to develop by the control medium, the heating current, a temperature in furnace 10, which is maintained at a control point. The control point and the set point are separated by a temperature difference dependent upon the load on the furnace. This difference is generally referred to in the control art as offset or droop.

Figure 4:
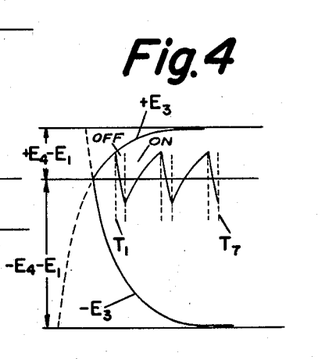

Had the temperature of furnace 10 changed in the opposite direction, below the set point, the motor 21 would have moved the contact 28 to the left and the potential difference $E_1$ would appear with a positive polarity at conductor 30 and a negative polarity at conductor 31. Accordingly, $E_1$ would be in aiding relation with $-E_4$ and as shown in Fig. 4, the negative capacitor charging voltage greatly exceeds the positive. An action opposite to that described in connection with Fig. 3 is now achieved.

At time $T_1$ the potential difference $E_3$ rapidly decreases to the required negative value for the operation of relay 41. After operation of contactor 43$b$ the decreased positive charging potential requires an extended period to attain the value required for operation to the coil of relay 42. Thus, the "off-time" is decreased and the "on-time" increased. The frequency of operation is again decreased, the two long "time-on" cycles replacing the three shorter "time-on" signals of Fig. 2.

Figure 5:
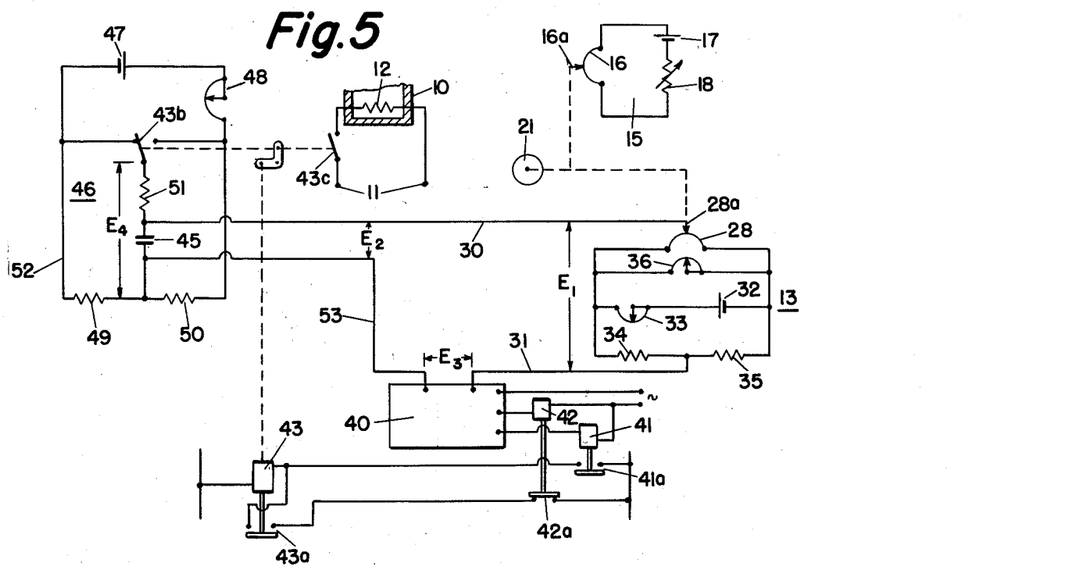
Fig. 5 diagrammatically illustrates a modification of the invention.

With the above understanding of the principles of the invention, reference will now be had to the modifying system of Fig. 5 where corresponding parts have been given the same reference characters and where a number of the parts shown in Fig. 1 have been omitted, it being understood that their omission is solely for the purpose of simplicity.

In Fig. 5 the system differs from Fig. 1 only in the location of the capacitor 45 within the network 46 instead of across the input circuit of amplifier 40. In both Figs. 1 and 5 the amplifier is of the high impedance type and for practical purposes no current flows between conductors 31 and 53.

By locating capacitor 45 between the contact element 43$b$ and the juncture between resistors 49 and 50, it will be seen that there will be applied to the capacitor first a potential difference of predetermined magnitude and first of one polarity and then of the opposite polarity. Assuming the charge on capacitor 45 is a maximum in the negative direction and that contact 43$b$ has just been moved to its right-hand position, the graph 59 of Fig. 6 will be representative of the potential difference $E_2$ appearing across capacitor 45 if contact 43$b$ were to remain in its right-hand position until $E_2$ rises to a maximum. If after rising to its maximum value switch element 43$b$ is moved to its left-hand position, then the capacitor 45 will be discharged in accordance with graph 60.

Figure 6:
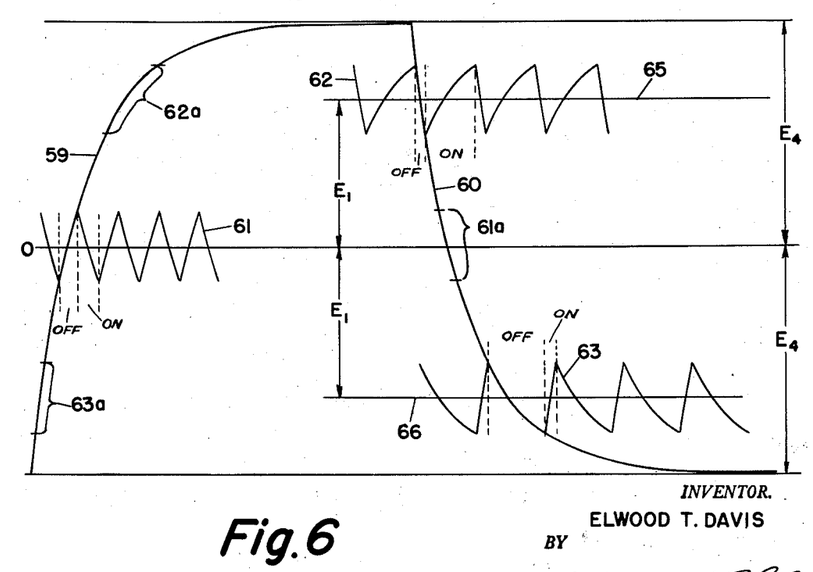
Fig. 6 is a graph explanatory of the operation of the system of Fig. 5.

With $E_1$ zero, the capacitor 45 will be successively charged and discharged and during equal time intervals. That condition of operation is illustrated by the graph 61. Graph 61 corresponds with graphs 54—56 of Fig. 2, the appropriate portion of the discharge curve applicable thereto being identified by the bracket 61$a$. Upon departure of the controlled condition from the set point, the motor 21 will adjust the contact 28$a$ of the control slidewire 28 and, hence, the potential difference $E_1$ will appear as explained in connection with Fig. 1. If the controlled variable is above the set point, conductor 30 will be made negative and conductor 31 positive. The effect on the amplifier 40 is the application thereto of a bias which moves the cyclical operation represented by graph 61 upward along the charging curve 59. For example, and depending upon the extent of departure from the set point, it may move to a position as indicated by the graph 62. The charging portion of each cycle of graph 62 is indicated on the charging curve 59 by the bracket 62$a$. By reason of the appearance of the bias voltage $E_1$ the voltage $E_2$ must be raised to a higher level in order to produce the cyclic change needed to operate relays 41 and 42. Accordingly, the capacitor 45 will operate at the higher voltage level and because of the difference in shape between graphs 59 and 60 not only will the "off-time" be increased relative to the "on-time" but also the frequency of operation of the final control element will decrease. Conversely, when $E_1$ adds to the circuit a bias of opposite polarity, the cyclic operation will occur at a lower level of charge on capacitor 45 and due to the difference in shape of the graphs 59 and 60 the "on-time" will increase relative to the "off-time" and the frequency of operation of the final control element 43 will decrease.

The foregoing is illustrated by the graph 63 with the charging portion thereof indicated on graph 59 by the bracket 63$a$.

From a comparison of the modifications of Figs. 1 and 5, it will be seen that many variations in the circuit may be made to change in the cyclic operation the "time-on" with respect to the "time-off" as well as the frequency of their occurrence. It will also be seen that while in Fig. 6 charging curve 59 has been drawn with its point of origin corresponding with a maximum negative charge on the capacitor 45 as produced by battery 47 and with the discharge curve 60 with its origin at a maximum positive charge on capacitor 45, the end-result in operation is quite similar to that produced by the modification of Fig. 1 as illustrated by Figs. 2–4. The important requirement present in both modifications is the operation which without change of the time constants of the circuit produces a change in the relative charging and discharging times of the capacitor. The resultant control signals as applied to the amplifier 40 produce relative changes between the "on-time" and the "off-time." As well understood by those skilled in the art, by changing the value of resistor 51, which may be made variable, the shape of the charging and discharging graphs of the capacitor 45 may be changed to provide adjustment of the impulse rate. The impulse or cycling rate is decreased by increasing the resistance of resistor 51 and it is increased by decreasing the value of that resistor. Similarly, by increasing the value of capacitor 45 the impulse rate will be decreased and by making capacitor 45 smaller the impulse rate will be increased.

In the preferred modification of Fig. 1 the average voltage or potential difference across capacitor 45 is zero and that average is zero under all conditions of operation including the three illustrated in Figs. 2–4. In Fig. 6, however, the average potential difference of capacitor 45 is zero only when $E_1$ is zero.

When $E_1$ is finite and with a polarity making conductor 30 positive relative to conductor 31, it will be seen that $E_2$ in order to be equal and opposite to $E_1$ must have an average value equal to $E_1$. Accordingly $E_1$, as shown on graph 6, effectively causes the average value of $E_2$ to be moved upwardly to the position indicated by the solid line 65. Conversely, when $E_1$ is of opposite polarity the average value of $E_2$ will be moved in the opposite direction as indicated by the solid line 66. The extent of the change depends upon the magnitude of $E_1$. The same result is achieved, however, either with $E_1$ applied to require an average value of the potential difference maintained on capacitor 45 other than zero ($E_2$ of Fig. 5) or whether the voltage $E_1$ is applied so that the average potential on capacitor 45 is maintained at zero, Figs. 1–4. But in each case the same or equivalent control actions are achieved.

The system of Fig. 1 is preferred because the location of capacitor 45 as in Fig. 5 introduces an additional variable, namely the change in the charge on the capacitor 45 from one level to another, as from the average value 65 to the average value 66. This additional variable results in the introduction of rate-action into the control system. Where rate-action is desired, it is preferred to introduce it in a manner later to be described so that its adjustment will be relatively independent of proportional action with which the description so far has been concerned and relatively independent of reset action obtained in a manner hereinafter to be described.

The resistor 36 adjusts the proportional band. By increasing the resistance of resistor 36, for a given relative movement between slidewire 28 and its contact 28$a$, the voltage or potential difference $E_1$ will be increased and by decreasing the value of resistor 36 the magnitude of voltage $E_1$ for the same change in position of contact $28a$ will be decreased. Thus the extent of change as between the "on-time" and "off-time" and the extent of change in the frequency thereof can be modified by the setting of resistor 36 to meet the requirements of any given process. The same result as regards the proportional band can be achieved by adjustment of resistor 48, which of course fixes the value of $E_4$. In some cases it will be desirable to mount resistors 36 and 48 on the same shaft or in other ways provide for their simultaneous adjustment to change the proportional band in the same direction.

Figure 7:
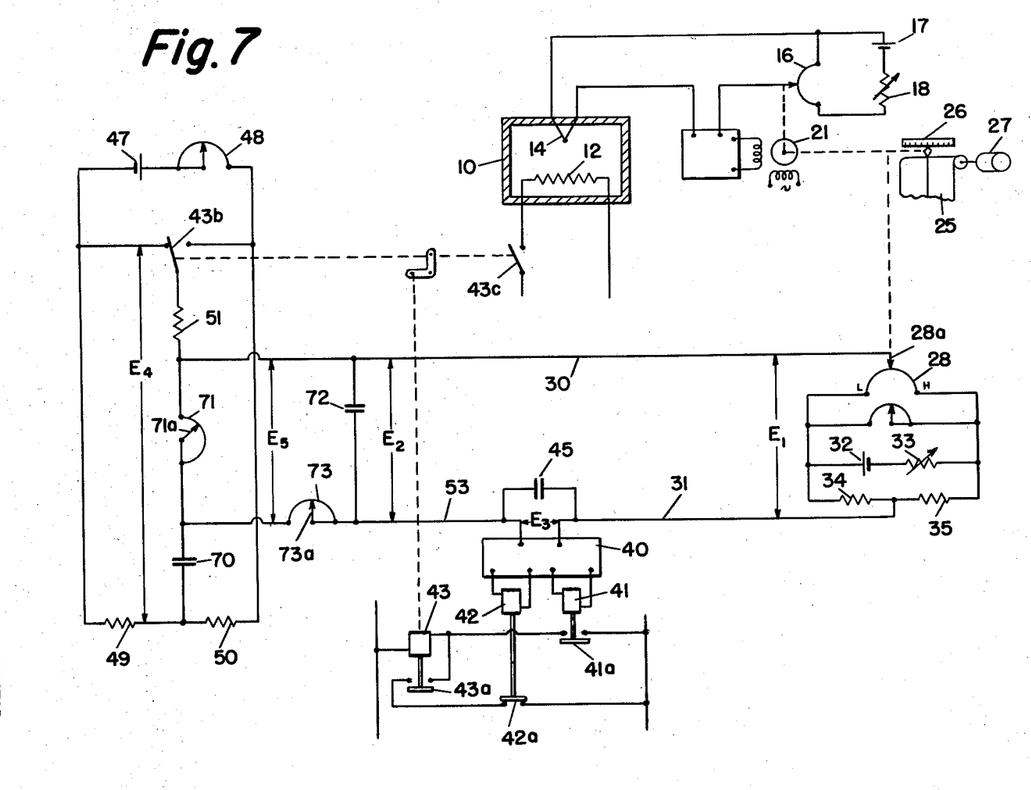
Figs. 7, 8 and 9 illustrate further modifications of the invention, each with added features which may be used with other modifications.

Referring now to Fig. 7 there will first be described the manner in which the capacitor 70 and the adjustable resistor 71 introduce reset action into the operation of the control system. The reset action corrects for offset or droop and may also be referred to as an integral action, that is, one in which the control system includes a component of control action which varies in accordance with a time integral function of the controlled variable. Fig. 7 is quite similar to Fig. 1 and the same parts have been given corresponding reference characters.

In the immediately following description it will be assumed that a rate capacitor 72 has been omitted and that a rate-controlling resistor 73 is either short-circuited, i. e., its contact $73a$ in its left-most position, or that it has been omitted with conductor 53 extending directly to the juncture between reset resistor 71 and reset capacitor 70.

It will be seen at once that the voltage or potential difference $E_4$ is now applied to a series branch including resistor 51, reset resistor 71 and capacitor 70. The voltage $E_5$ is that appearing across reset resistor 71. With the controlled variable at the control point ($E_1=0$) the average value of the voltage $E_5$ will be maintained at zero and will vary in manner quite similar to the voltage $E_3$ across capacitor 45. However, it is important here to observe that the potential difference or voltage $E_5$ appears only as the result of current flow through resistor 71 and that current flowing through resistor 71 flows only into or out of capacitor 70.

If it now be assumed that the temperature of compartment 10 is above the control point, the movement of contact $28a$ to the right of center on slidewire 28 will make conductor 30 negative with respect to conductor 31. By reason of the addition of this voltage $E_1$ to the series loop including capacitor 45 and resistor 71, the limits between which the voltage $E_3$ charges will be modified as already explained in connection with Fig. 3. However, because of the inclusion of capacitor 70 and reset resistor 71 the following occurs.

At time $T_1$, Fig. 3, and as contact $43b$ arrives in its left-hand position, the voltage $-E_4$ is applied in a direction to discharge capacitor 45. The time interval of discharge is relatively long as indicated by graph 57. During that relatively long interval from $T_1$ to $T_2$ the capacitor 70 receives a charging current of magnitude which develops across resistor 71 a voltage $E_5$ which it will be assumed will be of about the same magnitude as $E_2$ as shown in Fig. 1. At time $T_2$, Fig. 3, contact $43b$ of Fig. 1 moves to its right-hand position to reverse the polarity of the voltage $E_4$. The charge accumulated on capacitor 70 during the described operation has a polarity which is additive with respect to $+E_4$. Accordingly, capacitor 70 from time $T_2$ to $T_3$ discharges with contact $43b$ in its right-hand position, but it does not become fully discharged by reason of the relatively short time interval between $T_2$ and $T_3$. During that time interval the voltage $E_3$, Figs. 3 and 7, rises to a value which produces operation of relay 42 to return element $43b$ to its left-hand position. Accordingly, when contact $43b$ returns to its left-hand position there will be on capacitor 70 a part of its initial charge with the upper plate thereof negative and the lower plate positive. That remaining charge then is of a polarity which opposes $-E_4$. The net result is that the value of $E_3$ during periods of discharge, as represented by graph 57, in each successive cycle are made longer because of the additional decrease in the net-negative charging voltage for capacitor 45 resulting from the charge on capacitor 70 and because of the increase in the net-positive charging voltage for capacitor 45. Thus, the effect of the reset resistor 71 and of the reset capacitor 70 is to increase and make larger the charging effect of the quantity $(+E_4+E_1)$ by an amount which may be termed $E_{70}$, the voltage acquired by capacitor 70, and the charging effect of the quantity $(-E_4+E_1)$ is made smaller by the charge remaining on capacitor 70.

From the above discussion it will be seen that the charge acquired by capacitor 70 or the resultant potential difference developed by it is effective in changing the magnitude of the charging and discharging voltages applied to capacitor 45. The extent of the change in their magnitude will depend upon whether the change in the charge on capacitor 70 is greater with contact $43b$ in one position than it is in the other position. As shown in Fig. 3, and as above explained, that charge will be greater during the relatively long time intervals contact $43b$ is in its left-hand position as compared with the time it is in its right-hand position. If the charge on capacitor 70 due to current flowing through resistor 71 into capacitor 70 over a given time interval exceeds the loss of that charge due to current flowing from capacitor 70 through a given time interval there will be a net charge remaining on the capacitor 70.

The foregoing states that the net charge will depend upon the time integral of the current flowing to capacitor 70 with contact $43b$ in one position as compared with the time integral of the current flowing from capacitor 70 with the contact $43b$ in its other position. With the condition away from the control point, $E_1$ has a finite value and thus produces larger potential differences on capacitor 70 with each successive cycle, each cycle being ended by the movement of contact $43b$ from one to the other of its positions. As the controlled variable, the temperature of furnace 10, is returned toward the control point the time integral of current flow to capacitor 70 approaches equality with the time integral of current flowing from capacitor 70. Nevertheless, because the capacitor 70 has already acquired a net charge, that net charge remains and thus leaves in the control system a modifying potential difference which corrects for changes in the load which otherwise would produce offset or droop. That corrective action has heretofore been referred to as reset action. Offset has been defined as the steady-state difference between the control point and the value of the controlled variable corresponding with the set point. It is recognized as an inherent characteristic of proportional control systems including those of the average-position action type.

It is to be further understood that when the controlled variable, or the temperature of furnace 10, changes in a direction opposite to that above described and in a direction requiring additional heat, the contact $28a$ is moved to the left to make conductor 30 positive and conductor 31 negative. The situation represented by Fig. 4 again applies and the above description with respect to capacitor 70 likewise applies except, of course, that the capacitor 70 will soon acquire a charge of opposite polarity to that above described and its modifying action will augment the action shown in Fig. 4 and previously described.

The rate of reset action depends upon the requirements of the particular process under control and that rate can be readily changed by adjustment of resistor 71 as by its contact $71a$.

Reset action in Fig. 7 may also be explained in terms of average values of the several potentials. It will be recalled that when $E_1$ is zero, $E_3$, the input potential to the amplifier 40, will have an average value of zero and $E_2$, equal to $E_3$, will have an average value of zero.

Since the potential difference across resistor 71 is equal to $E_2$, it too will have an average value of zero. It will be recalled that when $E_1$ is finite, the operation of the amplifier 40 and the relays 41 and 42 are modified so that there is developed the voltage $E_2$ having an average value equal and opposite to $E_1$. With reset resistor 71 and reset capacitor 70 in the circuit, the average current flowing through resistor 71 must be such as to produce the average potential difference $E_2$ equal and opposite to $E_1$. But the current flowing through resistor 71 produces a charge on reset capacitor 70 which requires a different length of time of contact 43b in one or the other of its positions in order that the average potential difference across resistor 71 shall be equal and opposite to $E_1$. The change in "time-on" and "time-off" is thus introduced by the presence of resistor 71 and of capacitor 70 and the change is in the direction to introduce the reset action.

It will now be assumed that resistor 71 is omitted and that the capacitor 70 is removed from the circuit with the connections the same as in Fig. 1. With these assumptions the circuit of Fig. 7 then includes rate resistor 73 with contact 73a in the illustrated position and a rate capacitor 72 connected between the conductors 30 and 53. It will be seen that the potential difference $E_2$ between conductors 30 and 53 is the same as the potential difference across rate capacitor 72. Accordingly, when contact 43b arrives in its illustrated position the voltage $-E_4$ is immediately applied to a loop including resistor 73 and capacitor 72. As a result of flow of charging current through resistor 73 there will be a voltage drop therein and thus $E_2$ will be less than $E_5$ by the amount of that drop. If voltage $E_1$ changes at a given rate, then the average value of voltage $E_2$ will be caused to change at an equal rate and in opposition to the voltage $E_1$. However, due to the inclusion of capacitor 72 and resistor 73 the voltage $E_5$ changing at the same average rate as $E_2$ must be of greater magnitude to compensate for the potential drop in resistor 73. Thus the difference between the amplitude of voltages $E_2$ and $E_5$ introduces a modifying action into the control system, the magnitude of that action being dependent upon the rate of change of $E_1$. That corrective action is generally referred to as a rate or derivative action. The requirement that $E_5$ be made larger than $E_2$ to compensate for the potential drop in resistor 73 is met by the operation of the amplifier 40 and of relays 41 and 42 in changing the time that the contact 43b remains in one or the other of its positions. With the change in action of contact 43b, the average value of voltage $E_5$ is made to change at the rate and to have the instantaneous value to determine that the average value of voltage $E_2$ shall change at the same rate and in the opposite direction as $E_1$ to maintain the average voltage at the amplifier input equal to zero. The magnitude of the rate action may be varied to any desirable value by adjustment of the amount of resistor 73 which is placed in the charging current circuit for capacitor 72.

Figure 8:
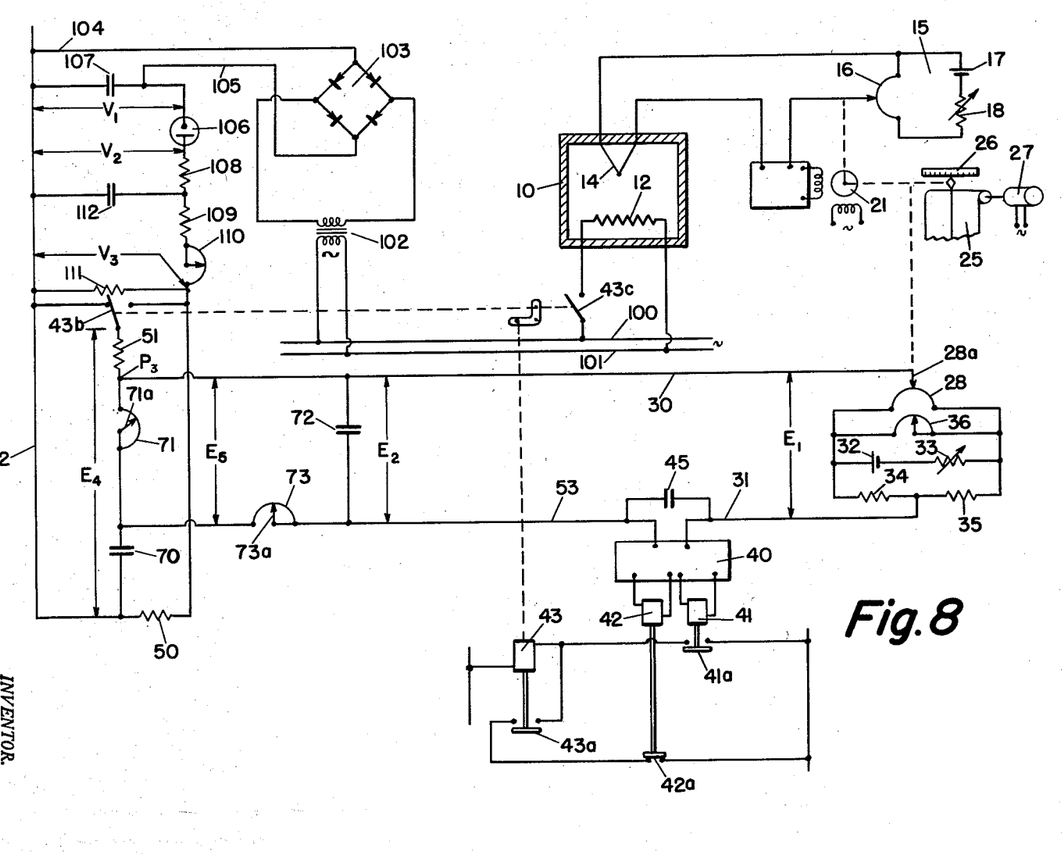

Referring now to Fig. 8, it will be observed that the heater 12 of furnace 10 is supplied from alternating-current supply lines 100 and 101. Where high precision is needed in maintaining the temperature at the control point, a variation in line voltage is particularly troublesome since the heating effect of resistor 12 varies as the square of the applied voltage. Thus, the control system must await a change in temperature before a corrective action is initiated. Thus, a 10% change in the voltage of lines 100 and 101 produces approximately a 20% change in the heat developed by resistor 12. The present invention includes provision for introducing a further compensating action which does not require the delayed action of the control system and which produces a constant heat input by resistor 12, notwithstanding substantial changes in the voltage across supply lines 100 and 101. The manner in which the anticipatory compensation is provided to take care of changes in line voltage will now be described.

In the system of Fig. 8 the source of voltage $E_4$ is derived from the supply lines 100 and 101 by way of a transformer 102, a rectifying device shown as a full-wave bridge 103, the output of which is applied by conductors 104 and 105 in place of the unidirectional source illustrated in Figs. 1 and 5. The voltage from the rectifying bridge 103 is connected to the control circuit by way of a voltage regulator tube 106 of the type known to those skilled in the art as a "VR" tube. A capacitor 107 is connected across the output conductors 104 and 105. The circuit components are selected so that the voltage $V_1$ appearing across capacitor 107 is twice the amplitude of the voltage $V_2$ appearing between conductor 104 and the plate of tube 106. Since the tube 106 maintains constant the voltage across it, it will be seen that a 10% change in the voltage $V_1$ will appear as a 20% change in the voltage $V_2$. More particularly, since the voltage $V_1$ is twice the voltage $V_2$ and since the voltage across tube 106 remains constant, if $V_1$ changes from 100 volts to 90 volts, $V_2$ will change from 50 volts to 40 volts. The change is transmitted by way of tube 106 without attenuation. The percent change from 50 volts to 40 volts is much greater than the percent change from 100 volts to 90 volts.

It will also be observed that there are provided resistors 108, 109, an adjustable resistor 110, and a resistor 111 in series with the voltage $V_2$, a capacitor 112 being connected at one side between resistors 108 and 109 and from the other side to conductor 52. Thus, the value of the voltage $E_4$ corresponds with that developed across resistor 111, and its value is selected by the size of the foregoing circuit components and may be adjusted by resistor 110 to change the width of the proportional band. The capacitors 107 and 112 form with voltage-regulating tube 106 a filtering circuit to attenuate alternating-current components which may appear in the output of bridge 103.

With the foregoing understanding of the added feature of the invention, it is to be understood that a regulating effect of the same kind may be achieved in the absence of tube 106 by selection of resistors 108 and 111 of materials having substantial temperature coefficients of resistance instead of being constant in resistance as was heretofore tacitly assumed. Specifically, resistor 108 may have a negative temperature coefficient of resistance and resistor 111 a positive temperature coefficient of resistance. Their temperatures change with change in current flow through them and hence their resistances change. If desired, each may be provided with heating coils energized from supply lines 100 and 101 to accentuate the temperature change with change in voltage across said lines. Thus, with a rise in voltage across the supply lines, negative temperature coefficient resistor 108 would decrease in resistance and positive temperature coefficient resistor 111 would increase in resistance. The net result is a disproportionate increase in the voltage appearing across resistor 111. From the foregoing it will be seen that by varying the rates of change of resistance with temperature of resistors 108 and 111 the ratio of $V_1$ to $V_3$ may be varied over a relatively wide range and to suit any particular law which it is desired shall be followed.

Where the heating of the furnace is unrelated to the voltage of the supply lines, such as, for example, with gas-fired furnaces, it will be desirable to provide suitable voltage regulating means. For example, the voltage-regulating tube 106 may be connected across the capacitor 112. In this manner the voltage $V_3$ will be maintained constant notwithstanding changes in the line voltage.

In Fig. 8 it will be observed there is one further difference as compared with the modification of Fig. 1. By connecting the lower end of capacitor 70 directly to conductor 52, it will be seen that with contact 43b in its illustrated position, $E_4$ is zero. However, with contact element 43b operated to its right-hand position, the voltage $E_4$ will be equal to the potential difference developed across resistor 111 and is the voltage which is effective to make the average value of $E_2$ equal and opposite to $E_1$. If the voltage across resistor 111, equal to $E_4$, changes, in order that average value of $E_2$ shall remain equal and opposite to a finite value of $E_1$, the contact element 43b must remain in its right-hand position for a changed average time interval related to the change in value of $E_4$. Thus, it will be seen that the change in $V_3$ and corresponding changes in the voltage $E_4$ directly affects the "time-on" or the period during which the heater 12 is energized. The action is in the correct direction to compensate for the heating effect due to changes in the line voltage and represents a further feature of the invention which introduces the additional correction to minimize or eliminate the effect on the heating of furnace 10 of line voltage changes.

There are times in the control of a process when it is desirable to regulate by hand the magnitude of the controlled varibale, such as the heat input to the furnace 10. While it is a relatively simple matter to arrange for the manual operation of the circuit-controlling element 43c, either directly or through push-button control of relays 41 and 42, control systems which include reset and rate actions do not upon return to automatic operation always continue the rate of heat application maintained during manual control. There results an undesirable change in heat input as a result of the return of the system to automatic control.

Further in accordance with the present invention, provisions are made for the return of the system to automatic control without introduction of a change in the heat input to the furnace 10 due solely to the operation of the transfer means.

Figure 9:
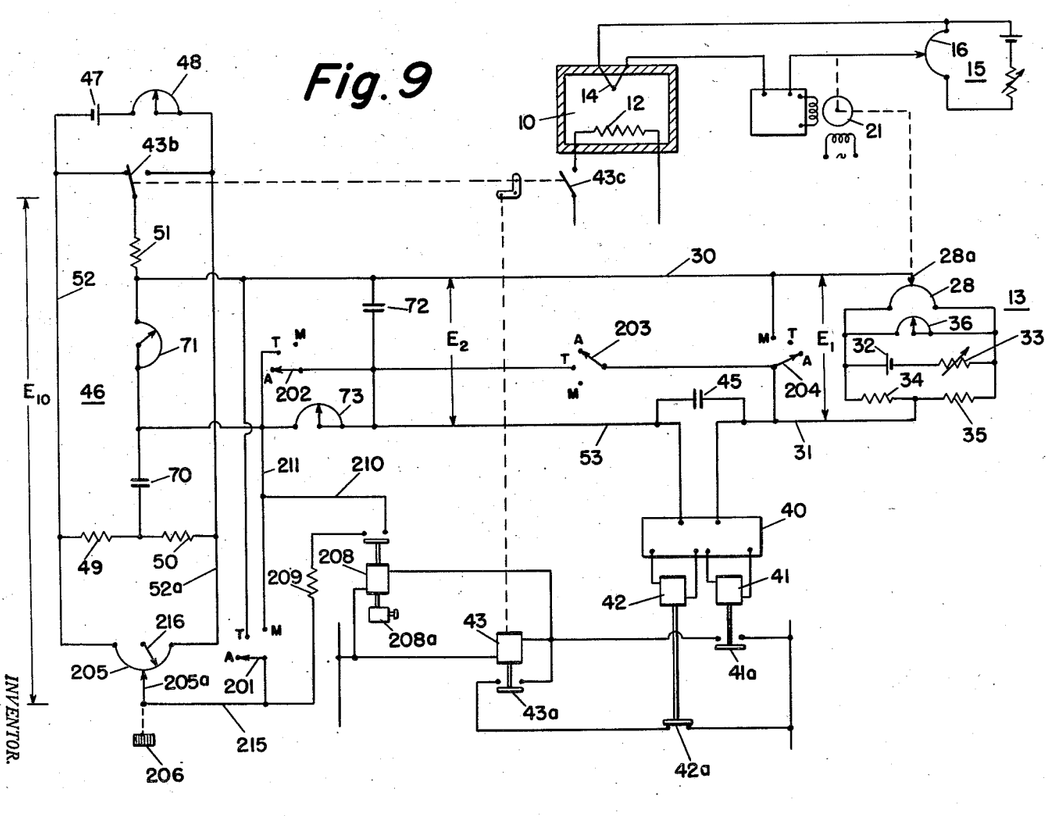

As shown in Fig. 9, with the simultaneously operated transfer switch contacts 201, 202, 203 and 204 in the "A" or automatic positions the system functions in the same manner as described in connection with Fig. 1. Upon operation, however, of transfer switch contacts 201—204 to the "M" or manual position, it will be seen that the output voltage $E_1$ is reduced to zero by the shorting, contact 204, of the output of associated control network 13. The amplifier input conductor 31 is connected by transfer contact 204 and by conductor 30 to resistor 51. The other amplifier input conductor 53 is connected by way of resistor 73 and transfer contact 201 to the movable contact 205a of a slidewire 205 connected across resistors 49 and 50. The potential of the mid-position of slidewire 205 is the same as the juncture of resistors 49 and 50. One side of capacitor 70 is connected by way of conductor 211 and contact 201 to slidewire contact 205a. With contact 205a in its mid-position, the voltage $E_{10}$, taking the place of voltage $E_4$ of Figs. 1–4, appearing between 205a and contact element 43b will with either polarity be of the same magnitude and the system will function as described in connection with Fig. 2 with the "time-on" equal to the "time-off."

By manually moving slidewire contact 205a as by a knob 206 toward the left, the voltage $-E_{10}$ will be decreased and the voltage $+E_{10}$ will be increased, the effect of which is to decrease the "on-time" and to increase the "off-time," as well as to decrease the frequency of the cyclic operation. The resultant operation will be as shown in Fig. 3. Conversely, when it is desired to increase the heat input to the furnace 10 slidewire contact 205a is moved to the right to increase $+E_{10}$ and to decrease $-E_{10}$ thereby increasing the "time-on" and decreasing the "time-off." The operation will then be as shown by Fig. 4. Accordingly, while the system continues its cyclic operation, the relative "on" and "off" times can be changed depending upon the manual setting of slidewire contact 205a. During manual control the capacitor 70 will have applied to it a voltage determined solely by the extent of movement of slidewire contact 205a from its mid-position.

If the transfer switch elements 201—204 are now returned to their automatic positions, with $E_1$ at a finite value, there would be introduced a materially modified control action due to the charging of capacitors 70 and 72, and the changed operation of the control system might well upset the process under control.

In accordance with the present invention, the transfer switch elements 201—204 are moved to a "T" or transfer position preparatory to transfer from manual to automatic. In the transfer position it will be observed that capacitor 45 is short-circuited and that the voltage $E_1$ is applied directly across the capacitor 72 and thus charges that capacitor in accordance with the extent of deviation of the temperature of the furnace 10 from the control point. The capacitor 70 is at the same time subjected to the algebraic sum of the voltage $E_1$ and that introduced by the position of slidewire contact 205a. Accordingly, the capacitor 70 will be charged to a value dependent upon the magnitude of voltage $E_1$ and upon the magnitude of the voltage representative of the heat input for furnace 10 at the time of transfer. The transfer contact elements 201—204 need only momentarily remain in their "T" positions after which they are moved directly to their illustrated "A" positions for return of the system to automatic control. There is avoided any "bump" or disturbance of the controlled variable due to the charging of capacitors 70 and 72 to values such that immediately upon transfer to automatic control the contactor 43 will continue to operate so that the average heat input to the furnace 10 is unchanged.

There will now be considered the operation of the system beginning with a cold furnace or one in which the temperature is far below that corresponding with the control point. Under the assumed condition the preferred operation will be fully automatic to bring the temperature of the furnace 10 up to the control point. Under the assumed condition of operation, $E_1$ will be large because of the stated assumption the temperature of furnace 10 is well below the control point. As $E_1$ increases due to a temperature drop, the system continues to increase the "time-on" relative to the "time-off" until, finally, the element 43b and contactor element 43c will remain continuously in their "on" positions. It will thus be seen that in that event or with the "time-on" greatly exceeding the "time-off," the heat input to furnace 10 will inevitably be greater than necessary to maintain its temperature at the control point. Accordingly, the likelihood of overshooting the control point is very great and in many applications of the invention it is desirable to introduce a further control action to prevent over-shoot. Such a control action is introduced into the system of Fig. 9 by a time-delay relay 208 which may be of the thermal type in which contacts are moved from a closed to an open position in response to the integrated heat release of a heating element energized with each operation of contactor 43. As shown, however, the relay 208 is of the dash-pot type with the time of closure under control by dash-pot 208a. The relay 208 is of the time-closing type and opens without time delay. In one typical embodiment of the invention the "time-on" of contactor 43c for somewhat less than full heat input to furnace 10 was just below the order of three minutes. Accordingly, the dash-pot 208a is set for closing of the relay 208 during cyclic operation of contactor 43 with its "on-time" near three minutes or more.

Again assuming that the system is cyclic with the "on-time" approaching or equalling that required for full heat input, it will be remembered that a charge will be building up on reset capacitor 70. The building up of the charge on reset capacitor 70, as heretofore explained, tends to increase the length of the "on-time" with corresponding decrease in the length of the "off-time." However, upon closure of the rate-of-approach relay 208 a discharge circuit is completed for capacitor 70 through conductors 211, 210, contacts of relay 208, a high-resistance resistor 209, and the slidewire contact 205a shown at the same potential as the lower side of capacitor 70. Thus, the discharge of capacitor 70 during the time relay-contacts 208 are closed reduces the length of the "on-time" relative to the "off-time." Stated differently, the controlled variable enters the proportional band earlier than it otherwise would and thus an anticipatory action is provided which tends to prevent over-shoot. The heat-input to furnace 10 is reduced prior to attainment of the control point.

The foregoing analysis assumed slidewire contact 205 remained in its mid-position and hence at the same potential as the lower end of capacitor 70. If slidewire contact 205a is other than in its mid-position a potential difference will be developed between the upper side of capacitor 70 and the lower side thereof with a polarity dependent upon the position of the contact 205a from its mid-position. Assuming now that contact 205a is in its right-most position, completing a circuit directly to conductor 52a, it will be seen that the maximum charging voltage for capacitor 70 then appears between conductors 52a and 215. Accordingly, capacitor 70 will not discharge. However, if contact 205a is placed along slidewire 205, say about half-way from its "zero" end and "center," the voltage introduced will be less than the maximum charging voltage for capacitor 70 and hence the latter will discharge through the circuit including resistor 209 to a lower voltage. Thus the position of contact 205a on slidewire 205 determines the magnitude of the rate-of-approach correction. Accordingly, the slidewire 205 may be suitably calibrated, as shown. It preferably has associated with it a frictionally-held pointer such as 216 which can be set for a rate of approach such that the temperature of the furnace 10 will be brought to the control point without over-shoot. It is emphasized that in the foregoing description the rate-of-approach corrective action is useful and desirable whether or not the system includes the transfer means for manual and automatic control.

Claims directed to the rate-of-approach corrective action have been presented in a continuation-in-part application, Serial No. 614,015, filed October 4, 1956, entitled "Control Systems with Rate of Approach."

It may sometimes be desirable to provide a slidewire for manual control and also a separate one to predetermine the rate-of-approach action. Thus, if slidewire 205 is used for manual control, the rate-of-approach slidewire may be connected in parallel with it, the only change in the circuit needed being the connection of resistor 209 to the added slidewire contact instead of being joined with conductor 215.

Where the system has been under manual control, as above described, the operator will, just prior to the time he returns the system to automatic control, move contact 205a into alignment with the rate-of-approach indicator 216, thereby insuring a proper rate-of-approach control action for his particular process.

The rate-of-approach action also involves rate capacitor 72 and slidewire 71. For example, with contactor 43 and element 43c continuously in the "on" position due to a large departure of the controlled variable from the control point and the resultant large magnitude of $E_1$, the reset capacitor 70 will approach its fully charged condition. As it approaches its fully charged condition, the current through slidewire 71 approaches the vanishing point. As a consequence, $E_2$ approaches "zero" and so does the charge upon rate capacitor 72. Once such a condition exists, the amplifier 40 and its associated relays will continue to maintain contactor 43 in its "on" position until the temperature of furnace 10 attains the control point. Such action is viewed by those skilled in the art as a shift of the proportional band until the lower limit thereof coincides with the control point. The foregoing shift of the proportional band is avoided, however, by the action of the rate-of-approach relay 208 and the rate-of-approach setter 205a. By introducing a predetermined corrective action of magnitude dependent upon the position of contact 205a along slidewire 205, there will always be current flowing through resistor 71 by way of the discharge circuit including resistor 209 and by reason of the setting of contact 205a. Thus, the voltage $E_2$ will not approach "zero" but will always have a value related to the product of the current flowing through resistor 71 and its resistance.

As voltage $E_1$ decreases toward the control point, a reversal in control action occurs when $E_1$ exceeds $E_2$. The result is that the reversal occurs earlier than when $E_2$ is near "zero" and in terms used by those skilled in the art, the lower limit of the proportional band is moved to a temperature below the control point and by an amount dependent upon the value of $E_2$ which in turn is dependent upon the setting of the rate-of-approach contact 205a. By initiating the cycling action before the control point is reached, the heat input to the furnace 10 is decreased from its high or maximum rate. The temperature then rises less rapidly until it attains the control point. It attains the control point without objectionable over-shoot.

While the description of the several modifications has been primarily in terms of the generation of heat, it is to be understood that the invention is equally applicable to cooling systems. When it is desired to cool the compartment, such as indicated at 10, the heating coil 12 will be replaced by a refrigerating coil or heat exchanger, with the supply of the cooling medium under the control of an "on" and "off" valve. Where the contactor 43 is shown in the open position, the arrangement will be for the "on" and "off" valve also to be in its "on" or open position for flow of a maximum volume of cooling fluid. With the foregoing change, the system will function to maintain the temperature of compartment 10 at the control point. However, the rate-of-approach setter will be reversed in its action with "zero" rate-of-approach action with contact 205a in its left-most position where it is directly connected to conductor 52 and with increasing rate-of-approach action as it is moved toward its right-most position.

In the modifications thus far described, the amplifier 40 and its associated relays 41 and 42 have been diagrammatically illustrated. Amplifiers of various types known to those skilled in the art may be employed to energize one or the other of the relays upon change of polarity of the input signal. As exemplary of a suitable amplifier, reference may be had to Fig. 10 where input terminals 31 and 53 correspond with conductors of like identification in the other figures. Thus, the input voltage $E_3$ is applied to a filtering network 400 made up of resistors and capacitors of size for the attenuation of alternating current, particularly in the frequency range of the alternating current supply, such as from supply lines 100 and 101. A synchronous vibrator or converter 401, energized from supply lines 100 and 101, intermittently applies to input capacitor 402 of the tube of the first stage 403 of the amplifier 40 the voltage $E_3$.

Figures 10, 11:
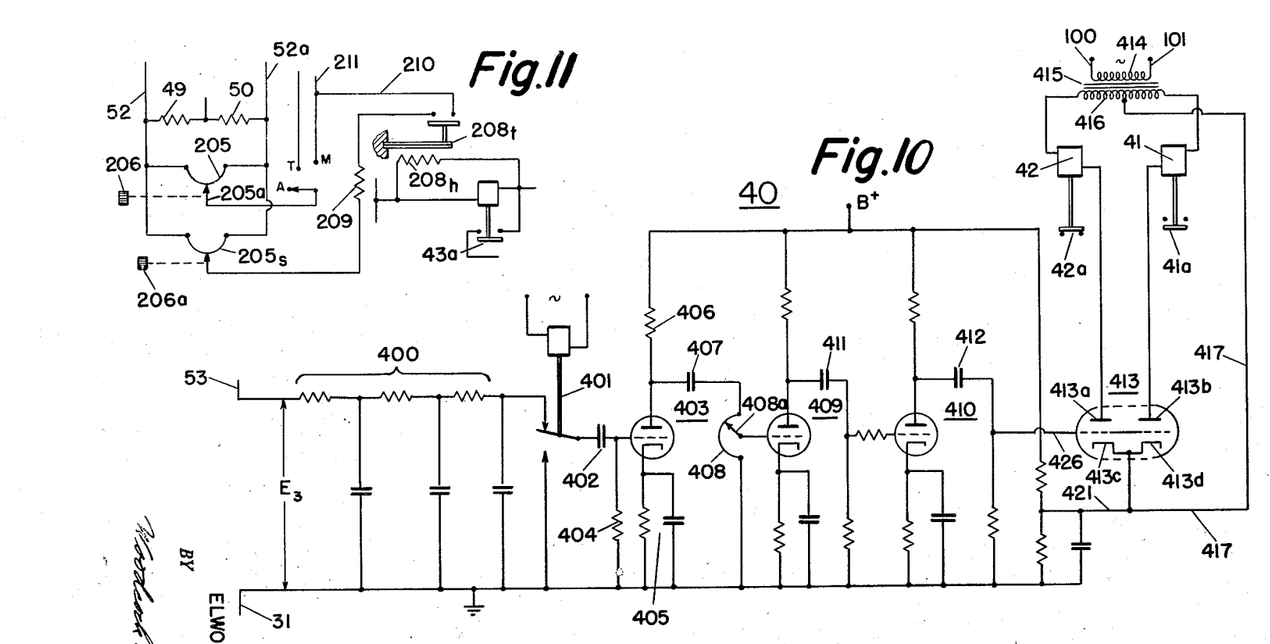
Fig. 10 illustrates one form of suitable amplifier illustrated in other modifications by block diagram.
Fig. 11 is a modification including a fractional part of Fig. 9.

When the movable contact of converter 401 is in its lowermost position the capacitor 402 is connected through a discharge circuit including a grid resistor 404. The tube of stage 403 is provided with a cathode biasing circuit 405, a plate resistor 406, and a coupling capacitor 407. As a result of the operation of converter 401 there appears in the output of stage 403 an alternating current which has a phase relative to that of the alternating current of supply lines 100 and 101 and an amplitude dependent upon the size of the input signal $E_3$. There is applied by way of capacitor 407 through a sensitivity-adjusting means comprising slidewire 408 and contact 408a, the output signal to the second stage 409 of amplifier 40.

As many amplifying stages may be used as desired, one additional stage 410 being illustrated and having applied thereto through coupling capacitor 411 the output signal from stage 409. The final power stage 413 of the amplifier is shown as including a twin triode tube. In Fig. 10 the two grids have been shown internally connected. It is to be understood that each will be externally connected to coupling capacitor 412 of the final voltage-amplifying stage 410.

The plates or anodes 413a, 413b of the twin triode are respectively connected through the coils of relays 42 and 41 to the ends of a secondary winding 416 of an alternating current supply transformer 415 having its primary winding 414 connected to alternating current supply lines 100 and 101. From the midpoint of secondary winding 416 there extends by way of conductor 417 a connection to the cathodes 413c and 413d of the twin triode of stage 413.

The operation will be readily understood from the following considerations. By reason of the illustrated connections of the secondary winding 416 the plate 413a is made positive with respect to its cathode 413c at the same instant the plate 413b is made negative with respect to its cathode 413d. Accordingly, if there be applied between input conductors 420 and 421 an input signal in phase with the alternating current applied to the first triode section of stage 413 the grid will be made positive with respect to the cathode at the same time that the plate or anode 413a is made positive with respect to its cathode 413c. Accordingly, the first section of stage 413 is made conductive and current flows from the left-hand side of secondary winding 416 through the coil of relay 42, through the left-hand triode section, and by conductor 417 to the mid-tap of the secondary winding. Thus, the relay 42 is energized to open its contacts 42a.

The input signal, in phase with the alternating current across the first section of stage 413, is at the same time 180° out of phase with the alternating current applied to the second triode of stage 413. The fact that the grid of the second triode is made positive relative to its cathode 413d is ineffective to change the conductivity thereof because the plate or anode 413b is during that interval made negative with respect to cathode 413d.

The foregoing situation immediately changes, however, upon a reversal of phase of the input signal to stage 413. Then the second triode is made conductive and relay 41 is energized to close its contacts 41a, while relay 42 remains deenergized.

The phase of the input signal applied across conductors 420 and 421 depends upon the polarity of the signal E₃ applied to input terminals or conductors 53 and 31. The polarity of that input signal in turn depends upon, for example in Fig. 1, the potential across capacitor 45.

As shown in Fig. 2, E₃ will be of one polarity while above the zero line and of the opposite polarity when below the zero line. The control signal E₃ must be large enough whether of one polarity or the other to make one triode section or the other of output stage 413 conductive. The needed size or amplitude of input signal E₃ is varied with the setting of contact 408a relative to resistor or slidewire 408. Thus, by adjusting the sensitivity of the amplifier by the setting of contact 408a there may be controlled the extent of rise of the input signal E₃, whether in the positive or negative direction, with reference to the zero line of Figs. 2–4 needed to operate either relay 41 or 42. In this manner the frequency of cyclic operation, i. e. the impulse rate, may be adjusted as desired. Referring to Fig. 2, the change in amplifier sensitivity produced by changes in setting of contact 408a of Fig. 10 varies the limits of the graphs 54—56. Increasing the sensitivity serves to move the positive and negative limits closer together so that the time interval required for E₃ to change from one of these relay-operating limits to the other is reduced. Accordingly the cycling or impulse frequency is thereby increased. Conversely a decrease in amplifier sensitivity moves these relay-operating limits farther apart resulting in a reduction of the impulse frequency or rate.

The circuit components in the amplifier are conventional, it being understood they will be selected with reference to the particular amplifying tubes utilized.

While the values of the various circuit components of Figs. 1, 5, 7–9 may be varied within relatively wide limits, it is believed it may be helpful if there be presented a set of values which may be taken not by way of limitation upon the scope of the invention but as illustrative of typical embodiments of the invention. They are as follows:

Resistor 51_________________ 3 megohms.
Resistor 71_________________ Range, to 100 megohms.
Capacitor 70________________ 10 mfd.
Resistors 49 and 50__________ 2,200 ohms each.
Rate resistor 73____________ 0–50 megohms.
Rate capacitor 72___________ 24 mfd.
Capacitor 45_______________ 20 mfd.
Resistor 209_______________ 10 megohms.
Resistor 205_______________ 10,000 ohms.

In the above table it will be seen that the resistor 51 and the capacitor 45 provide a time constant of sixty seconds.

It will be recalled that mention has already been made of the fact that certain features illustrated in connection with one modification of the invention may be used with any of the other modifications of the invention. Thus, for example, the manual-automatic provisions of Fig. 9 may be used either with or without the rate-of-approach setter, and the reset capacitor of Fig. 7 may be applied to either of the systems of Figs. 1 or 5. Similarly, the rate-of-approach setter of Fig. 9 may be applied, with reset, to such systems as Figs. 1 and 5.

While explanation has already been made as to the manner in which the rate-of-approach setter varies the position of the proportional band relative to the control point, it is emphasized that the operation of relay 208 occurs after the average value of the control agent (the heat which changes the temperature of furnace 10) exceeds a predetermined value. The average value of the control agent, of course, is established by the average time contactor element 43c remains in its closed position. Where the relay 208 operates after a predetermined period of time during which contactor element 43c is in its "on" position, the average value of the control agent will exceed a predetermined value, such, for example, as the value established when element 43c has an "off" time very short in comparison with the "on" time. Of course, the contactor element 43c may be continuously maintained in the "on" position, and after a predetermined interval, in the above description, three minutes, the relay 208 may be energized to complete the rate-of-approach-modifying circuit. On the other hand, when the relay is of the integrating type, such as the thermal relay, the operation to complete the rate-of-approach-modifying circuit will occur depending upon the magnitude of the time integral of closure of contactor element 43c. The time of closure of relay 208t of Fig. 11 will depend upon the past history of operation of that contactor element. Referring generically to said operations, it will be seen that the relay means 208 or 208t operates after the average value of the control agent exceeds a predetermined value for limiting the action of the reset capacity in shifting the proportional band.

There has been illustrated in Fig. 11 a fractional part of Fig. 9 including a thermal relay 208t in which the heating coil 208h is connected in place of the operating coil of relay 208 of Fig. 9, and there is shown associated therewith both the manual setter slidewire 205 and the separate rate-of-approach setter 205s.

So far as applicable the 1952 automatic control terminology adopted by the American Society of Mechanical Engineers has been utilized.

What is claimed is:

1. A control system comprising a final control element movable from one of two fixed positions to the other for varying the magnitude of a controlled variable, means including a sensitive device responsive to the magnitude of said controlled variable for operating said control element periodically from one of its said positions to the other and for varying the time-average said control element remains in one or the other of its said positions in compensation for deviation of said controlled variable from a predetermined value, comprising a storage capacitor, a voltage source therefor, a flow resistance network including resistors for regulating flow of energy to and from said capacitor, actuating means operable upon change from one predetermined level to another of the energy stored in said capacitor for actuating said final control element first to one and then to the other of said fixed positions, means operable under the control of said controlled variable for developing across one of said resistors a potential difference related in magnitude to the departure of said controlled variable from said predetermined value to regulate in accordance with the departure of said controlled variable from said predetermined value the time-average during which said controlled element remains in one or the other of its said fixed positions, and a reset capacitor connected in said network effectively in series with said source and one of said resistors for modifying said flow of energy in accordance with the time integral of said potential difference.

2. The combination set forth in claim 1 in which a third capacitor and a third resistor are so connected in said network as to introduce a component of rate action control of said final control element, said third resistor being connected in series with said storage capacitor.

3. A control system including a final control element movable from one of two fixed positions to the other for changing a controlled variable, actuating means for said control element, a control network for said actuating means comprising a storage capacitor and a resistor, means including a circuit-changer for applying a voltage of one magnitude and then a voltage of a different magnitude to said capacitor through a circuit including said resistor, said actuating means being operable upon predetermined changes in the potential across said capacitor for moving said control element from one to the other of its positions, said network including a reset capacitor effectively in series in said circuit of said storage capacitor for modifying the operation of said actuating means in accordance with the time integral of departure of said controlled variable from a control point, means for operating said circuit-changer with each operation of said actuating means for changing the magnitude of the voltage applied to said resistor and to said storage capacitor, means for developing in said control network a potential of magnitude related to the extent of departure of said controlled variable from said control point and of polarity dependent upon the direction of said departure for modifying the charging time relative to the discharging time of said storage capacitor, manually operable means for effectively removing from said network said voltage varying with change of said controlled variable and for controlling the charging and discharging times of said storage capacitor, and circuit means included in said network operable before said voltage varying with the magnitude of said variable is reapplied to said network for establishing a predetermined charge upon said reset capacitor to avoid disturbance of the system upon return to operation under the control of said voltage varied with change of said controlled variable.

4. The combination set forth in claim 3 in which said control network includes a rate resistor and a rate capacitor, and in which said circuit means is operable during return of said system under the control of said voltage introduced by change of said controlled variable for predetermining the charge on said rate capacitor, said rate resistor being connected in series with said storage capacitor.

5. A control system including a final control element movable from one of two fixed positions to the other for changing a controlled variable, actuating means for said element, a control network for said actuating means comprising a capacitor and a resistor, means including a circuit-changer for applying a voltage of one magnitude and then a voltage of a different magnitude to said capacitor through a circuit including said resistor, said actuating means being operable upon predetermined changes in the potential across said capacitor for moving said control element from one to the other of its positions, said network including a reset capacitor connected between said control network and said voltages for modifying the operation of said actuating means in accordance with the time integral of departure of said controlled variable from a control point, means for operating said circuit-changer with each operation of said actuating means for changing the magnitude of the voltage applied to said resistor and to said capacitor, means for developing in said control network a potential of magnitude related to the extent of departure of said controlled variable from said control point and of polarity dependent upon the direction of said departure for modifying the charging time relative to the discharging time of said first capacitor, manually operable means for effectively removing from said network said voltage varying with change of said controlled variable and for controlling the charging and discharging times of said first capacitor, and means operable before said voltage varying with the magnitude of said controlled variable is reapplied to said network for reducing to approximately zero the charge on said first capacitor and for establishing a predetermined charge upon said reset capacitor to avoid disturbance of the system upon return to operation under the control of said voltage varied with change of said controlled variable.

6. A control system comprising a final control element movable from one to the other of two circuit-controlling positions for varying the magnitude of a controlled variable, a storage capacitor, a voltage responsive detector, a potentiometer for producing a potential difference of sign and magnitude dependent upon the direction and extent of departure of said condition from a predetermined value, an input circuit for said detector having said capacitor and said potentiometer in series-circuit relation, a source of supply for said capacitor, a charging circuit extending from said source of supply to said capacitor and including therein a resistor and a switch for selectively connecting the capacitor to said source, actuating means for said switch operable upon movement of said final control element from one to the other of its said positions to change said connections to said capacitor for flow of energy to and from said capacitor to reverse at said detector the voltage applied thereto, and means responsive to the output of said detector for actuating said final control element from one to the other of its positions upon reversal of said voltage applied to the input of said detector, said capacitor having an exponential charging characteristic and an exponential discharge characteristic, any potential difference developed by said potentiometer being algebraically added into said input circuit to produce charging and discharging of said capacitor at respectively different portions of its said charging and discharging characteristics to vary the time said final control element remains in one of its positions relative to the other to regulate in accordance with the magnitude of said potential difference developed by said potentiometer the time average during which said control element remains in one or the other of its said positions.

7. The combination set forth in claim 6 in which a reset capacitor is in series with said switch and said source for acquiring a potential difference which modifies the potential difference introduced into said input circuit from said source, a reset resistor included in said input circuit and in circuit with said switch and said reset capacitor for flow of current to and from said capacitor for maintaining an average potential difference across said reset capacitor proportional to the time integral of said potential difference produced by said potentiometer for producing a component of reset control action in the operation of said final control element.

8. A temperature-regulating system in which the temperature is varied by change in the heating current in a heating resistor, comprising a final control element movable from one to the other of two circuit-controlling positions for making and breaking a heating circuit to said resistor, means including a sensitive device responsive to the magnitude of said temperature for operating said control element periodically from one of its said positions to the other for varying the time average said control element remains in one or the other of its said positions in compensation for deviation of said temperature from a predetermined value comprising a storage capacitor, a voltage source therefor and a flow resistance network including resistors for regulating flow of energy to and from said capacitor, said voltage source comprising the source of said heating current in said heating resistor, actuating means operable upon change from one predetermined level to another of the potential difference across said capacitor for actuating said final control element first in one and then to the other of said fixed positions, temperature-responsive means operable under the control of said temperature for developing across one of said resistors a potential difference related in magnitude to departure of said temperature from said predetermined value to regulate in accordance with said departure from said predetermined value the time average during which said control element remains in one or the other of its said positions, and means including a voltage divider and a constant voltage device operable in response to changes in voltage of said source to apply to said storage capacitor a voltage changed by a relatively greater percentage than the percentage change of said voltage of said source.

9. A temperature-regulating system in which the temperature is varied by change in the heating current in a heating resistor, comprising a final control element movable from one to the other of two circuit-controlling positions for making and breaking a heating circuit to said resistor, means including a sensitive device responsive to the magnitude of said temperature for operating said control element periodically from one of its said positions to the other for varying the time average said control element remains in one or the other of its said positions in compensation for deviation of said temperature from a predetermined value comprising a storage capacitor, a voltage source therefor and a flow resistance network including resistors for regulating flow of energy to and from said capacitor, said voltage source comprising the source of said heating current in said heating resistor, actuating means operable upon change from one predetermined level to another of the potential difference across said capacitor for actuating said final control element first to one and then to the other of said fixed positions, temperature-responsive means operable under the control of said temperature for developing across one of said resistors a potential difference related in magnitude to departure of said temperature from said predetermined value to regulate in accordance with said departure from said predetermined value the time average during which said control element remains in one or the other of its said positions, and means operable upon change in said voltage source for changing to relatively greater degree the voltage applied to said storage capacitor than the voltage applied to said heating resistor to produce said current flow therethrough comprising resistance devices one connected in series with said voltage source and one connected in parallel therewith, at least one of said resistance devices being non-linear.

10. A control system comprising a final control element, circuit connections between said voltage source and said final control element, said final control element being movable from one to the other of two circuit-controlling positions to change said connections to vary the magnitude of a controlled variable, means including a sensitive device responsive to the magnitude of said controlled variable for operating said control element periodically from one to the other of its said positions for varying the time average said control element remains in one or the other of its said positions in compensation for deviation of said variable from a predetermined value, a voltage source, a storage capacitor, a flow resistance network connected to said voltage source and including resistors for regulating flow of energy to and from said capacitor, actuating means operable upon change from one predetermined level to another of the energy stored in said capacitor for actuating said final control element first to one and then to the other of said fixed positions, means operable under the control of said controlled variable for developing across one of said resistors a potential difference related in magnitude to the departure of said controlled variable from said predetermined value to regulate in accordance with the departure of said controlled variable from said predetermined value the time average during which said control element remains in one or the other of its said fixed positions, and means operable upon change in the voltage of said source for changing to relatively greater degree the voltage applied to said storage capacitor than the voltage applied under the control of said final control element to vary the magnitude of said controlled variable comprising resistance devices one connected in series with said voltage source and one connected in parallel therewith, at least one of said resistance devices being non-linear.

References Cited in the file of this patent

UNITED STATES PATENTS

| | | |
|---|---|---|
| 2,006,658 | Smulski | July 2, 1935 |
| 2,148,491 | Moore | Feb. 28, 1939 |
| 2,268,285 | Ivanoff | Dec. 30, 1941 |
| 2,376,488 | Jones | May 22, 1945 |
| 2,495,844 | Hornfeck | Jan. 21, 1950 |
| 2,499,906 | Crise | Mar. 7, 1950 |
| 2,544,031 | Kyle | Mar. 6, 1951 |
| 2,651,468 | Joesting | Sept. 8, 1953 |
| 2,651,704 | Prior | Sept. 8, 1953 |
| 2,688,334 | Jewett | Sept. 7, 1954 |
| 2,703,679 | Shank et al. | Mar. 18, 1955 |